3,652,578
[ANTHRACENOTRIAZOLE]BENZOIC ACID
DERIVATIVES
Hubert Linares, Lyon, France, assignor to Rhone-
Poulenc S.A., Paris, France
No Drawing. Filed July 30, 1969, Ser. No. 846,279
Claims priority, application France, Aug. 1, 1968,
161,552
Int. Cl. C07d 55/02; C09k 1/02
U.S. Cl. 260—308 B    5 Claims

ABSTRACT OF THE DISCLOSURE

[Anthraceno(1,2 - d)triazole(1,2,3)]benzoic acids and their esters, which are novel, are useful optical bluing agents for synthetic fibres.

---

The present invention relates to [anthracenotriazole] benzoic acid derivatives and their use in the optical bluing of synthetic fibres.

It is known that optical bluing agents absorb light in the ultraviolet vicinity, and re-emit this energy as blue visible radiation, the complementary colour to yellow. Such agents are used in synthetic fibres, which always have a more or less pronounced yellow appearance, so as to change the appearance of the fibre and to obtain very pure white fabrics.

Very many optical bluing agents exist in industry, the majority of which are oxadiazoles, benzoxazoles, naphthalimides, bis-styrylbenzenes, coumarins or aryltriazoles. This last type generally have either a triazole nucleus attached to a stilbene derivative (see French Pat. No. 1,321,046 and Belgian Pat. No. 664.605) or a combination of two triazole groupings sometimes attached to other heterocycles (see French Pat. No. 1,484,539). These optical bluing agents, which are very complex molecules obtained from expensive reactants, are of high cost.

A new class of optical bluing agents has now been found which are produced under much more advantageous conditions and which have the general formula:

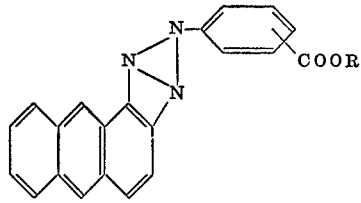

(I)

in which R denotes a hydrogen atom or a hydrocarbon radical, it being possible for the grouping COOR to occupy any position on the benzene nucleus. More particularly, the hydrocarbon radical R may be an alkyl radical containing, for example, from 1 to 6 carbon atoms, a cycloalkyl radical containing for example, from 5 to 6 nuclear carbon atoms, or an aryl radical, for example a phenyl radical, an alkylphenyl radical, or a phenylalkyl radical containing from 7 to 12 carbon atoms.

The compounds of Formula I are obtained by reaction of a cupric salt on a (2-amino-1-anthryl)azo-benzoate of the formula:

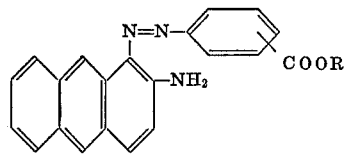

(II)

This method of cyclising oxidation has been described by Carbonari J. Amer. Chem. Soc. 89, 2618 (1967) and by Houben-Weyl X, 3, page 426. Generally, copper sulphate in an ammoniacal medium is employed. The compounds of Formula I in which R represents a hydrogen atom may also be obtained by saponification of compounds of Formula I in which R represents a hydrocarbon radical.

The (2-amino-1-anthrylazo)benzoates of Formula II may be obtained by reacting 2-aminoanthracene with diazonium salts of esters of aminobenzoic acids.

The compounds of Formula I are useful for the optical bluing of synthetic fibres, more particularly of polyester and polyamide fibres. They may be incorporated by any known method, for example, by impregnation in a bath. Preferably, however, they are added to the monomers before the polymerisation, for example to a content from 0.01% to 0.2% of the weight of the monomers, preferably from 0.05% to 0.1%.

The compounds of Formula I are light-fast and stable at the temperature employed in the textile industry. They are not entrainable either by washing or by distillation. They have the property of re-emitting ultra-violet light as radiation of a wavelength between 0.40 and 0.45µ, generally between 0.41 and 0.43µ. Such a re-emission wavelength associated with an appropriate intensity of the re-emitted radiation contributes to ensuring good optical bluing.

The following Examples illustrate the invention.

EXAMPLE 1

Into a round-bottomed flask containing 2100 ml. of anhydrous pyridine are introduced 138 g. of ethyl p-(2-amino-1-anthrylazo)benzoate and 234 g. (1.47 mol) of anhydrous copper sulphate, and the mixture is refluxed for 5 hours. At the beginning of the heating, a change of colour from violet-red to brown is immediately observed. After cooling, 2 litres of water are added, the mixture is suction-filtered and the precipitate is washed with water. The precipitate is dissolved in 7 l. of toluene and is purified in solution by treatment with decolourising charcoal. By successive concentrations, 56 g. of a yellow-coloured product (M.P. 207° C.) are isolated. Micro-analysis and infra-red spectrography show that it is ethyl p-[2-anthraceno(1,2-d)triazole(1,2,3)]benzoate of the formula:

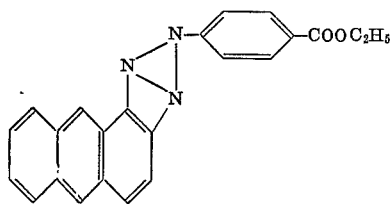

This product re-emits absorbed light in the form of two radiations of a wavelength of 0.41 and 0.425µ.

The product obtained is employed for bluing poly-(ethylene glycol terephthalate). Into a 7.5 litre reactor are introduced 15 mol of methylene terephthalate, 37.5 mol of ethylene glycol, the transesterification catalyst (manganese acetate), and 2.9 g. of the product prepared as just described. The reactants are heated to 140–200° C. so as to effect the transesterification, the methanol is eliminated at 200° C. and the excess glycol is then distilled under a pressure of 0.3 mm. Hg, with heating to 285° C.

The total duration of the distillation is 3 hours. The polymer obtained is converted into filaments, which have an attractive white appearance contrasting with the yellow appearance of the non-blued polymers. It is found that the distilled glycol is not contaminated by bluing agent. This glycol can be used to form non-blued or differently blued polyesters.

The starting ethyl p-(2-amino-1-anthrylazo)benzoate is obtained by diazotation of ethyl p-aminobenzoate, followed by condensation of the diazonium salt with 2-aminoanthracene by the following procedure. 22.6 g.

3

(0.137 mol) of ethyl p-aminobenzoate are dissolved in 90 ml. of dimethylformamide. 400 ml. of water and 200 g. of ice are added, and then 60.6 ml. of concentrated hydrochloric acid (0.70 mol). The suspension is cooled to 0 to 3° C. with an ice bath. A solution of 9.6 g. (0.139 mol) of sodium nitrite in solution in 40 ml. of water is then run in, the temperature of the medium being maintained at 0 to 3° C. (duration 40 minutes). After the runnng-in, the mixture is stirred for 2 hours at 0 to 3° C.

A solution of 26.4 g. of 2-aminoanthracene (0.137 mol) in solution in 970 ml. of pyridine is run into the mixture containing the diazonium salt. The running-in lasts 2 hours, the temperature being maintained at 8 to 10° C. The medium turns to a very deep violet-red colour. After stirring for 1 hour at 8 to 10° C., a solution of 50 g. of sodium acetate in 205 ml. of water is run in, and the temperature is then allowed to warm up to 20° C. Ethyl p-(2-amino-1-anthrylazo)benzoate precipitates, and is filtered off and washed with water until the pyridine odour disappears. After drying in hot air, 41 g. of violet-red ethyl p-(2-amino-1-anthrylazo)benzoate, M.P. 203° C., are obtained.

EXAMPLE 2

Butyl p-[2 - anthracene(1,2-d)triazole(1,2,3)]benzoate is prepared as in Example 1 from butyl p-aminobenzoate. From 2.9 g. of butyl p-aminobenzoate and 2.9 g. of 2-aminoanthracene, 5.6 g. of butyl p-(2-amino-1-anthrylazo)benzoate, M.P. 140° C., are obtained. By cyclising oxidation, 1.3 g. of butyl(anthracentotriazole)benzoate, M.P. 188° C., are obtained. This compound is recrystallised from a mixture of benzene and ethanol (50/50). It re-emits absorbed light at wavelengths of 0.413μ and 0.430μ.

EXAMPLE 3 p[2-Anthraceno(1,2-d)triazole(1,2,3)]benzoic acid is prepared by saponifying 1.5 g. of the ethyl ester of Example 1 in a solution containing 240 ml. of ethylene glycol and 0.9 g. of potassium hydroxide. After refluxing for 3 hours, and 0.9 g. of the acid is obtained. This acid re-emits absorbed light at wavelengths of 0.412μ and 0.430μ.

I claim:
1. A compound of formula:

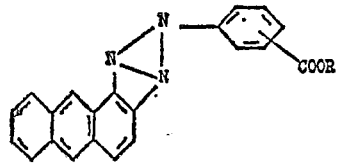

in which R is hydrogen, alkyl of 1 to 6 carbon atoms, cycloalkyl of 5 to 6 carbon atoms, phenyl, phenylalkyl of 7 to 12 carbon atoms, or alkylphenyl of 7 to 12 carbon atoms, and the grouping COOR may occupy any position in the benzene ring.

2. A compound according to claim 1 in which R is alkyl of 1 to 6 carbon atoms.

3. A compound according to claim 1 which is ethyl p-[2-anthraceno(1,2-d)triazole(1,2,3)]benzoate.

4. A compound according to claim 1 which is butyl p-[2-anthraceno(1,2-d)triazole(1,2,3)]benzoate.

5. A compound according to claim 1 which is p-[2-anthraceno-(1,2-d)triazole(1,2,3)]benzoic acid.

References Cited
UNITED STATES PATENTS 2,141,707  12/1938  Ebel _____ 260—308
2,867,624  1/1959   Anderson _____ 260—308

ALTON D. ROLLINS, Primary Examiner

U.S. Cl. X.R.

8—1 W; 252—301.2 W; 260—141, 192